United States Patent [19]

Rainey

[11] Patent Number: 4,963,218

[45] Date of Patent: Oct. 16, 1990

[54] METHOD FOR REINFORCING PATTERN PIECES

[76] Inventor: Tina N. Rainey, 3042 Sherwood La., St. Charles, Mo. 63301

[21] Appl. No.: 370,786

[22] Filed: Jun. 23, 1989

[51] Int. Cl.⁵ ............................................. B32B 31/20
[52] U.S. Cl. ................................... 156/299; 2/243 B; 33/12; 156/323; 156/334; 428/486; 428/513
[58] Field of Search ................. 156/299, 334, 321, 63, 156/323; 33/12, 5, 13, 14, 17 A, 17 R; 2/243 B; 112/440; 434/87, 88; 428/486, 513

[56] References Cited

U.S. PATENT DOCUMENTS 3,245,857 4/1966 Rutledge .......................... 156/321 X
4,597,812 7/1986 Hamilton ......................... 156/299 X

FOREIGN PATENT DOCUMENTS 1118787 10/1965 United Kingdom .
1139194 2/1966 United Kingdom ................... 33/12

Primary Examiner—Robert A. Dawson
Assistant Examiner—Michele K. Yoder
Attorney, Agent, or Firm—Edward R. Weber

[57] ABSTRACT

A method of preserving or otherwise reinforcing the thin, pre-existing tissue-like paper patterns used in dressmaking, crafts, and the like, in which a sturdy backing paper is bonded to the thin, pre-existing tissue-like paper pattern pieces allowing the pattern pieces to be reused many times without deterioration, which method may be practiced without extensive commercial equipment.

9 Claims, No Drawings

METHOD FOR REINFORCING PATTERN PIECES

FIELD OF THE INVENTION

The present invention relates to methods of preserving or otherwise reinforcing pattern pieces. More particularly, it relates to methods of preserving or otherwise reinforcing the thin, tissue-like paper patterns used in dressmaking, crafts, and the like, so that the pattern pieces may be reused many times without deterioration thereby improving or enhancing the appearance and quality of the product or garment which is created from the pattern pieces.

BACKGROUND OF THE INVENTION

Dressmakers and other artisans oftentimes use handmade or store-bought patterns, which are drawn or printed on thin, tissue-like paper, to make their garments, toys, household furnishings, etc. In use, the dressmaker or other artisan spreads the fabric, or other material from which the end product is being made, on a flat surface and places the various pattern pieces on the material in accordance with the instructions provided by the pattern. The pattern pieces are then secured to the material by any number of known means, such as pinning. The process of placing the pattern pieces and securing them generally leads to deterioration which affects the garment, toy, or other end product by causing it to be misshapen due to incorrect sizing. Additionally, the pattern pieces can become unusable due to unintentional tearing or use with straight pins or certain other means used to secure the pattern pieces.

It is therefore among the objects of the invention to provide a means for preserving the thin, tissue-like pattern pieces to prevent or slow the process of deterioration resulting from handling during multiple uses of the pattern. It is a further object of the invention to strengthen the thin, tissue-like pattern pieces to prevent unintended tearing or deterioration resulting from the use of straight pins or certain other means of securing the pattern pieces to the fabric or other material from which an end product is being created. It is a further object of the present invention to provide an inexpensive method of preserving pattern pieces. It is another object of the present invention to provide a method for preserving pattern pieces which is simple to use. Other objects and features will be in part apparent and in part pointed out hereinafter.

SUMMARY OF THE INVENTION

The present invention comprises a method by which paper pattern pieces are reinforced by bonding them to a more durable backing. This is accomplished by the application of heat with a conventional household iron.

The backing is a durable paper which is coated on one side with a thermoplastic substance, such as wax, polyethylene, polypropylene, or the like. To practice the invention, the backing paper is positioned on a flat, heat-resistant surface with the coated side up. The pattern pieces, which are to be reinforced, are then placed on the backing paper and arranged so that no overlapping of the individual pieces occurs. A protective material is then placed over the pattern pieces as arranged on the backing paper. Moderate, dry heat is then applied using a conventional household iron in such manner that the thermoplastic material is slightly melted with the result that each pattern piece is bonded to the backing paper.

In a preferred embodiment, the pattern pieces would be cut from the larger tissue sheet on which all pieces of a store-bought pattern are printed so that the individual pieces are shaped approximately one-half inch larger than the cutting line shown on the individual pattern piece. The pattern pieces would then be placed on the coated side of the backing paper. A lightweight tissue, which ideally is semi-transparent so that the person practicing the process can visually determine that each pattern piece has been completely bonded and has not shifted, yet sturdy enough to withstand moderate temperatures, is then placed over the pattern pieces and the backing paper. Moderate, dry heat, such as would be received from an iron set at the cotton temperature setting, is then administered with a gentle ironing motion. The bonded assembly of backing paper and pattern pieces is then allowed to cool. The lightweight tissue is removed when the cooling process is completed. The reinforced pattern pieces may then be cut out for use.

If desired, any markings which appear on the printed pattern pieces may then be transferred onto the backing material using a tracing wheel and marking paper or other known methods. It will be further understood that any instructions which might be printed on the paper pattern could likewise be preserved via this method.

In view of the above, it will be seen that the several objects of the invention are achieved and other advantageous results attained. As various changes can be made in the above method without departing from the scope of the invention, it is to be understood that all matter contained in the above description shall be interpreted as illustrative and not in a limiting sense.

What is claimed is:

1. A method of reinforcing pre-existing pattern pieces which may be performed without extensive commercial equipment consisting of:
    (a) placing a backing material, coated on one side with a thermoplastic material, on a flat, heat-resistant surface with the coated side up;
    (b) placing said pre-existing pattern pieces on said coated backing material and arranging said pattern pieces in such manner that no overlapping of individual pattern pieces occurs;
    (c) placing a protective lightweight material over said pre-existing pattern pieces as arranged on said coated backing material;
    (d) applying heat to said protective lightweight material for a sufficient amount of time so as to soften or partially melt the thermoplastic coating on said backing material and applying sufficient pressure so as to cause said pre-existing pattern pieces to bond to said coated backing material;
    (e) allowing the bonded assembly of pre-existing pattern pieces and coated backing material to cool; and
    (f) removing said protective material from said bonded assembly of pre-existing pattern pieces and coated backing material.

2. A method according to claim 1 in which said backing material is coated with a thermoplastic substance selected from the group consisting of wax, polyethylene, and polypropylene.

3. A method according to claim 1 in which said heat is moderate in temperature and dry.

4. A method according to claim 1 wherein the heat and pressure are applied using a conventional household iron.

5. A method of bonding a sturdy backing paper to thin, pre-existing tissue pattern pieces for the purpose of preserving or reinforcing said thin, pre-existing tissue pattern pieces, which may be practiced without extensive commercial equipment consisting of:
  (a) placing said sturdy backing paper, which is coated on one side with a thermoplastic material, on a flat, heat-resistant surface with the coated side up;
  (b) placing said thin, pre-existing tissue pattern pieces on the coated side of said backing paper and arranging said thin, pre-existing tissue pattern pieces in such manner that no overlapping of individual pattern pieces occurs;
  (c) placing a lightweight material over said thin, pre-existing tissue pattern pieces as arranged on said coated backing paper;
  (d) applying heat and pressure to said lightweight material for a sufficient amount of time so as to completely bond said thin, pre-existing tissue pattern pieces to said coated backing paper;
  (e) allowing the bonded assembly of thin, pre-existing tissue pattern pieces and coated backing paper to cool; and
  (f) removing said lightweight material from said bonded assembly of thin, pre-existing tissue pattern pieces and coated backing paper.

6. A method according to claim 5 wherein the thermoplastic substance is selected from the group consisting of wax, polyethylene, and polypropylene.

7. A method according to claim 5 in which said heat is moderate in temperature and dry.

8. A method according to claim 5 in which said heat is produced by a conventional household iron.

9. A method according to claim 5 in which said pressure is applied using a gentle, circular ironing motion.

* * * * *